United States Patent
Hullman et al.

(10) Patent No.: US 7,204,666 B2
(45) Date of Patent: Apr. 17, 2007

(54) FIXING CLAMP FOR ANCHORING A COMPONENT IN THE HOLE OF A SUPPORT PLATE

(75) Inventors: Klaus Hullman, Lorrach (DE); Michael De Jong, Binzen (DE); Martin Habrom, Wolfsburg (DE); Horst Karg, Wolfsburg (DE); Aschwin Maas, Overdinkel (NL)

(73) Assignee: A. Raymond & CIE, Grenoble (FR)

( * ) Notice: Subject to any disclaimer, the term of this patent is extended or adjusted under 35 U.S.C. 154(b) by 162 days.

(21) Appl. No.: 10/488,361

(22) PCT Filed: Aug. 8, 2002

(86) PCT No.: PCT/EP02/08856

§ 371 (c)(1),
(2), (4) Date: Aug. 17, 2004

(87) PCT Pub. No.: WO03/021112

PCT Pub. Date: Mar. 13, 2003

(65) Prior Publication Data

US 2005/0025603 A1    Feb. 3, 2005

(30) Foreign Application Priority Data

Aug. 30, 2001 (DE) .......................... 101 42 528

(51) Int. Cl.
F16B 39/284 (2006.01)
F16B 37/98 (2006.01)
(52) U.S. Cl. .................. 411/111; 411/112; 411/432; 411/970
(58) Field of Classification Search ........ 411/111–113, 411/432, 970, 913
See application file for complete search history.

(56) References Cited

U.S. PATENT DOCUMENTS

| | | | | |
|---|---|---|---|---|
| 2,303,148 A | * | 11/1942 | Tinnerman | 411/111 |
| 2,495,037 A | * | 1/1950 | Tinnerman | 411/112 |
| 2,605,806 A | * | 8/1952 | Tinnerman | 411/112 |
| 2,635,666 A | | 4/1953 | Murphy | 411/112 |

(Continued)

FOREIGN PATENT DOCUMENTS

| | | | |
|---|---|---|---|
| FI | 933089 | | 6/1995 |
| FR | 2583469 | * | 6/1985 |
| FR | 2665229 | | 7/1990 |

*Primary Examiner*—Katherine Mitchell
(74) *Attorney, Agent, or Firm*—Gifford, Krass, Sprinkle, Anderson & Citkowski, P.C.

(57) ABSTRACT

A fixing clamp for anchoring a component within a hole in a support plate includes an anchoring part having two side walls and a transverse wall, a generally planar locating strip projecting outwardly, an expanding tab projecting upwardly that defines a window in the side wall, and an inwardly bent edge strip on an end of the expanding tab. The fixing clamp also includes a movable threaded plate initially supported by the edge strip. The fixing clamp further includes a holding plate for the component and a fixing screw, and the fixing screw is threaded onto the threaded casing of the threaded plate, such that tightening of the fixing screw displaces the threaded plate downwardly along a longitudinal axis of the threaded portion of the fixing screw while deforming the expanding tabs outwardly until the expanding tabs are clampingly engaged with the support plate.

6 Claims, 2 Drawing Sheets

U.S. PATENT DOCUMENTS

| | | | | |
|---|---|---|---|---|
| 2,727,552 A | * | 12/1955 | Chvesta | 411/112 |
| 2,832,254 A | | 4/1958 | Viger et al. | 411/80.1 |
| 2,867,258 A | * | 1/1959 | Flora et al. | 411/113 |
| 3,783,922 A | * | 1/1974 | Petrus | 411/111 |
| 5,067,863 A | * | 11/1991 | Kowalski | 411/85 |
| 5,536,125 A | * | 7/1996 | Gaw, Jr. | 411/182 |
| 5,632,584 A | * | 5/1997 | Acevedo | 411/182 |
| 5,636,891 A | * | 6/1997 | Van Order et al. | 296/37.7 |
| 6,629,809 B2 | * | 10/2003 | Vassiliou | 411/173 |

* cited by examiner

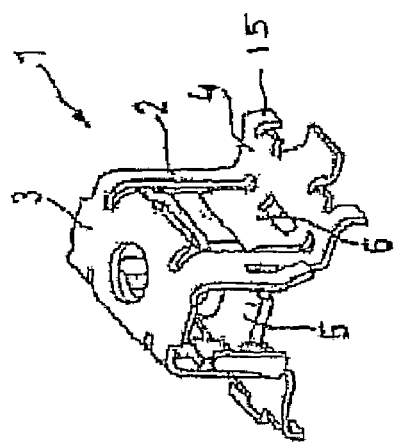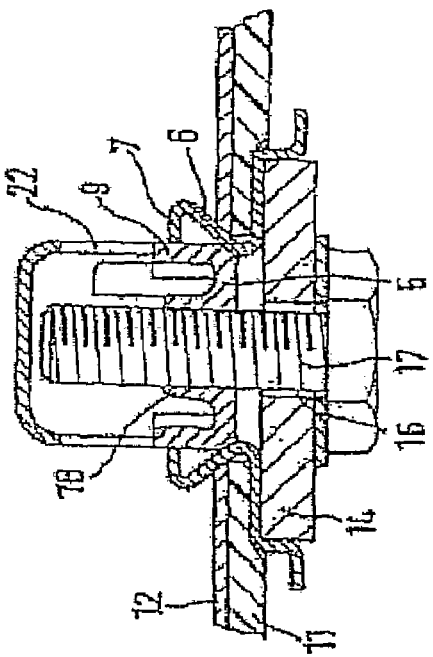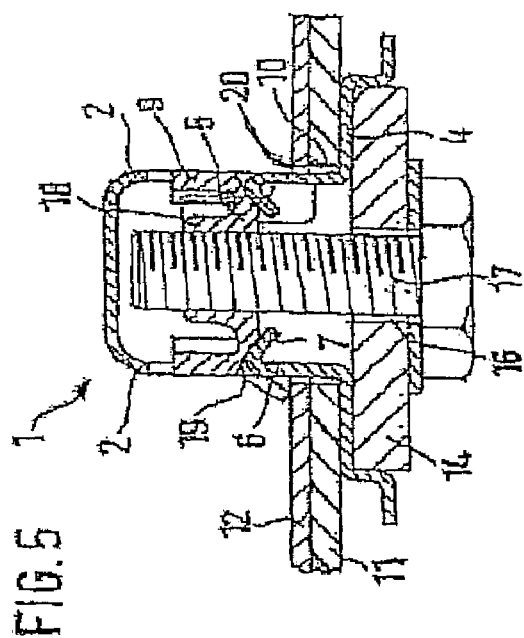

FIXING CLAMP FOR ANCHORING A COMPONENT IN THE HOLE OF A SUPPORT PLATE

BACKGROUND OF THE INVENTION

1. Field of the Invention

The invention relates to a fixing clamp for anchoring a component in a hole in a support plate, especially for the blind fixing of a handle to the ceiling of a motor vehicle.

2. Description of the Related Art

Fixing clamps are known for anchoring a component in a hole in a support plate. They usually include an anchoring part with locating strips projecting outward at right angles as well as expanding tabs that are connected to a threaded plate. The expanding tabs are located opposite each other and spread outward by screwing a screw supported on the component into the threaded plate, such that the expanding tabs are supported on the back side of the edge of the hole in the support plate. An example of a fixing clamp is disclosed in U.S. Pat. No. 2,184,783.

It is desirable that during the blind fixing of a handle to the ceiling of a motor vehicle, that the handle be at first preassembled with the fixing clamp on the molded ceiling. The preassembled handle and fixing clamp can then be completely assembled into the upper transverse post of the car body. Known fixing clamps are poorly suited for preassembly, because they are designed only for direct fixing in the hole of a metal plate, but not for a preassembly in the hole of the molded ceiling, which is made from a less rigid material. Moreover, the screw for tightening the expanding tabs until they are supported on the hole edge must be turned relatively frequently, which takes the worker a correspondingly longer amount of time during the assembly of the handle.

The invention has the problem of simplifying the preassembly of the handle on the molded ceiling as well as the subsequent mounting on the car body by an appropriate changing of the fixing clamp. The separate threaded plate and the relatively short dimensioning of the expanding tabs assure that the expanding tabs are pressed to the side after only a few turns of the screw and come to rest firmly on the back side of the hole edge. In addition, the inclusion of the threaded plate in the anchoring part provides for a smooth guidance of the threaded plate within the side walls.

SUMMARY OF THE INVENTION

Accordingly, the present invention is a fixing clamp for anchoring a component in an aperture of a support plate.

BRIEF DESCRIPTION OF THE DRAWINGS

Advantages of the present invention will be readily appreciated as the same becomes better understood by reference to the following detailed description when considered in connection with the accompanying drawings, wherein:

FIG. 4 is a perspective view of the fixing clamp;

FIG. 5 is a cross sectional view of the fixing clamp preassembled in a molded ceiling and support plate with the fixing screw screwed in; and FIG. 6 is a cross sectional view of the assembly shown in FIG. 5 after the tightening of the fixing screw and expansion of the expanding tabs.

DETAILED DESCRIPTION OF THE INVENTION

Figure 1:
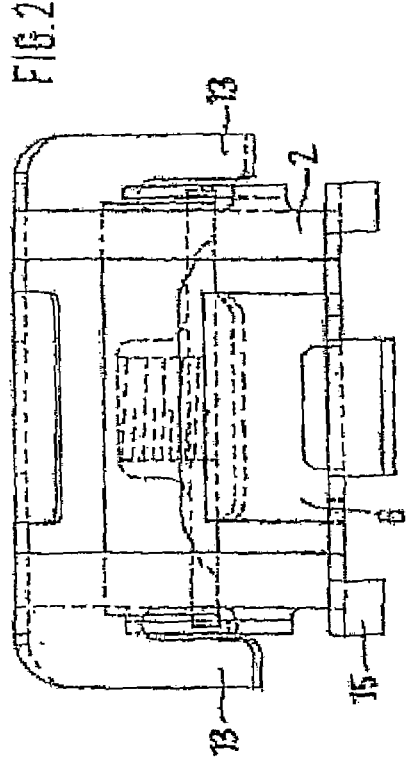
FIG. 1 is a cross sectional view of a fixing clamp according to the present invention.
Figure 2:
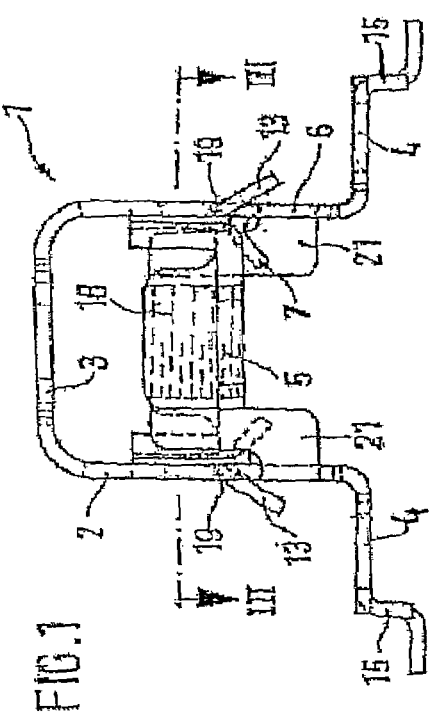
FIG. 2 is a lateral view of the fixing clamp according to the present invention.
Figure 3:
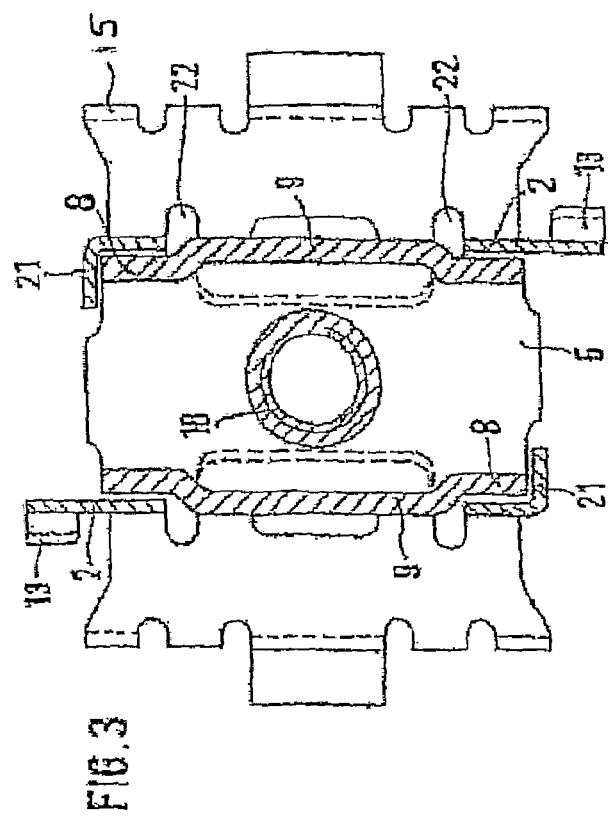
FIG. 3 is a sectional top view of the clamp through a threaded plate, taken along line III—III in FIG. 1.

Referring to FIGS. 1–6, a fixing clamp is illustrated for anchoring a component within an aperture in a support plate 12. The clamp includes a generally U-shaped anchoring part 1. The anchoring part 1 includes two spaced apart side walls 2 each having upper and lower ends. Each side wall 2 extends longitudinally between opposite ends. An upper transverse wall 3 extends between the upper ends of the side walls 2. A locating strip 4 projects outwardly at generally right angles from each lower end of each side wall 2. A transitional corner is defined by the intersection between each locating strip 4 and each respective side wall 2. A transverse tab 21 is bent inwardly from at least one end of each side wall 2. Further, the transverse tabs 21 are disposed at opposite ends of the respective side walls 2. As described in further detail below, a threaded plate 5 is disposed between the side walls 2, such that opposite corners of the threaded plate 5 are movably guided by the transverse tabs 21.

A bendable, expanding tab 6 is stamped in each side wall 2, resulting in a generally rectangular window or free punch area 22 in each side wall 2. Each tab 6 projects from the transitional corner into a portion of the free punch area 22. An edge strip 7 is directed obliquely relative to the locating strips 4. The edge strip is defined by a bend at the distal ends of the expanding tabs 6 and functions as support for the threaded plate 5. More specifically, the edge strip 7 is bent inwardly generally toward the threaded plate 5. The inward bend of the edge strip 7 advantageously facilitates preassembly of the anchoring part 1 with the support plate 12, i.e. the edge strip 7 does not interfere as the anchoring part 1 is inserted through the aperture in the support plate 12. Preferably, the threaded plate 5 is formed from thin plate steel. A threaded casing 18 is formed generally in the middle of the threaded plate 5. A pair of spaced apart side walls 8 extend orthogonally from opposite ends of the threaded plate 5 and are movably guided between the side walls 2 of the anchoring part 1. The side walls 8 of the threaded plate 5 are offset to the outside, in correspondence with the width of the free punch area 22 in side walls 2. More specifically, the side walls 8 include an offset wall part 9 that extends into the free-punched area 22 of the side walls 2 above the expanding tabs 6. As a result, the offset wall part 9 is movably guided between the side walls 2 in the free-punched area 22.

FIGS. 5 and 6 show the sequence of assembly of the fixing clamp, such as during a blind fixing of a handle to a ceiling 11 of a motor vehicle body. In this example, the support plate 12 is disposed adjacent the ceiling 11. The ceiling includes generally rectangular hole 10 that corresponds with the aperture in the support plate 12. The aperture in the support plate 12 defines an aperture edge 20. As shown in FIG. 5, the fixing clamp is first positioned within the rectangular hole 10 in the ceiling 11 and then through the aperture in the support plate 12, until the locating strip 4 abuts the ceiling 11. As a result, fingers 13 projecting outwardly from the side wall 2 engage the support plate 12, in order to prevent the fixing clamp from backing out of the hole 10 in the ceiling and the aperture in the support plate 12.

The handle that is to be fastened to the ceiling 11 includes a holding plate 14. The holding plate 14 is positioned between a plurality of limiting tabs 15 projecting orthogonally from the locating strips 4. In this example there are four limiting tabs 15. A fixing screw 17 is disposed within a hole 16 bored in the holding plate 14. Then, the fixing screw 17 is screwed into the threaded casing 18 of the threaded plate 5. The side walls 2 of the anchoring part 1 prevent rotation of the threaded plate 5 with respect to the fixing screw 17. The threaded plate 5 is displaced along a longitudinal axis of the fixing screw 17 in response to the rotation of the fixing screw 17, until the side edges 19 of the threaded plate 5 abut the edge strips 7 of the spreading tabs 6. Alternatively, the fixing clamp may be preassembled together with the holding plate 14 of the handle by screwing the screw 17 into the rectangular hole 10 in the ceiling 11 by spreading the fingers 13. The preassembly is then pressed in the hole 12 in the support plate 12 during final assembly.

In FIG. 6, the screw 17 has been tightened to such an extent that the edge strips 7 are pressed away laterally by threaded plate 5, thereby deforming the expanding tabs 6. The expanding tabs 6 are firmly pressed against hole edge 20 of fixing hole 10 due to contact with the side edges 19 of threaded plate 5. The expanding tabs 6 are clampingly engaged with the support plate 12. The tips of the edge strips 7 are held outwardly by the side walls 8 of the threaded plate 5. The contact between the edge strips 7 and the side walls 8 of the threaded plate 5 further help to maintain the expanding tabs 6 in clamping engagement with the support plate 12. It should be appreciated that in this example the generally softer material of the ceiling 11 is slightly compressed at the same time.

If the handle needs to be replaced, the anchoring part 1 may remain in hole 10 of support plate 12 after the removal of the screw 17. The holding plate 14 may be subsequently reused for screwing on another handle.

The invention has been described in an illustrative manner. It is, therefore, to be understood that the terminology used is intended to be in the nature of words of description rather than of limitation. Many modifications and variations of the invention are possible in light of the above teachings.

The invention claimed is:

1. A fixing clamp for anchoring a component within a hole in a support plate comprising:
    an anchoring part that is insertable into the support hole, wherein the anchoring part has two spaced apart side walls each having an upper end and a lower end, and a transverse wall extending between the upper end of each respective anchoring part side wall;
    a generally planar locating strip projecting outwardly at a right angle from the lower end of each respective anchoring part side wall;
    an expanding tab formed in each respective anchoring part side wall that projects upwardly from a transitional corner disposed between the locating strip and each respective anchoring part side wall, wherein the expanding tab defines a window in the respective anchoring part side wall;
    an edge strip located at a distal end of the expanding tab, wherein the edge strip is bent inwardly from each respective anchoring part side wall and located oblique to the locating strip;
    a movable threaded plate enclosed between each respective anchoring part side wall and the transverse wall, and initially supported by the edge strip portion of the expanding tab formed in each respective anchoring part side wall, wherein the threaded plate includes a threaded casing located in a middle portion of the threaded plate;
    a holding plate for the component having a centrally located hole;
    a fixing screw having a head portion and a threaded portion, and the head portion is adjacent the holding plate and the threaded portion is disposed within the holding plate hole and threaded onto the threaded casing of the threaded plate within the anchoring part, wherein tightening of the fixing screw displaces the threaded plate downwardly along a longitudinal axis of the threaded portion of the fixing screw, while deforming the expanding tab formed in each respective anchoring part side wall outwardly until the expanding tab is clampingly engaged with the support plate.

2. The fixing clamp of claim 1 wherein the threaded plate further includes a pair of spaced apart side walls extending orthogonally from opposite ends of the threaded plate and movably guided between each respective anchoring part side wall, wherein the threaded plate side walls are offset to the outside and correspond with a width of the window in each respective anchoring part side wall, and each threaded plate side wall includes an offset wall portion extending into the window in each respective anchoring part side wall above the expanding tab, so that the offset wall portion is movably guided within the window in each respective anchoring part side wall.

3. The fixing clamp of claim 1 wherein the support plate includes an aperture having an aperture edge, and the anchoring part is disposed within the support plate aperture until the locating strip is adjacent the support plate and a plurality of fingers projecting outwardly from each respective anchoring part side wall engage the support plate.

4. The fixing clamp of claim 1 further including at least one transverse tab bent inwardly from a lower edge of each respective anchoring part side wall, wherein each respective anchoring part side wall includes said at least one transverse tab positioned on each respective anchoring part side wall so that opposite corners of the threaded plate are movably guided by the transverse tabs.

5. The fixing clamp according to claim 1, further including side walls formed on the threaded plate, wherein the threaded plate side walls are shiftably guided within the window in each respective anchoring part side wall.

6. The fixing clamp according to claim 5, wherein each of the threaded plate side walls are offset to the outside of the threaded plate, correspond in size to a width of the window in each respective anchoring part side wall, and extend into the window in each respective side wall above the expanding tab.

* * * * *